US006339394B1

(12) United States Patent
Cantrell

(10) Patent No.: US 6,339,394 B1
(45) Date of Patent: Jan. 15, 2002

(54) DIGITAL COHERENT RADAR

(75) Inventor: Ben H. Cantrell, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/663,136

(22) Filed: Sep. 15, 2000

(51) Int. Cl.$^7$ ............................................... G01S 13/00
(52) U.S. Cl. ..................... 342/159; 342/82; 342/134; 342/175; 342/195; 342/202
(58) Field of Search ............................. 342/82, 83, 88, 342/159, 173–175, 195, 202–204, 131

(56) References Cited

U.S. PATENT DOCUMENTS 2,513,478 A * 7/1950 Gutton ........................ 342/88
3,715,753 A * 2/1973 Applebaum et al. ........ 342/131

* cited by examiner

Primary Examiner—Bernarr E. Gregory
(74) Attorney, Agent, or Firm—John J. Karasek; Charles J. Stockstill

(57) ABSTRACT

The digital coherent radar generates its transmitted waveform from a low intermediate frequency (IF) and a local oscillator (LO) by digitally generated waveforms after passing through digital-to-analog (D/A) converters. The LO is increased in frequency using a product multiplier. The IF representation of the transmitted waveform is upconverted using the LO. The transmitted waveform is amplified and passed through a circulator to an antenna. The echos are received through the antenna and passed through the circulator and receiver protector. The received signal is then downconverted to a digital signal and passed on to a processor. Finally, the waveform is reset and restarted by the local oscillator generator, the digital-to-analog converters, and the analog-to-digital converter at the beginning of each pulse. It must be insured that all pulses in a pulse train are identical even though there are deterministic errors in the representation of the transmitted signals desired coherent component. This insures that all transmitted and received signals regardless of their errors in representation (i.e., spurious signal content) have the same exact representation from pulse-to-pulse for clutter like signals. If this is not done, the error type echo signals (i.e., spurious signals) will not be the same every pulse and may not cancel while the intended signal will.

9 Claims, 1 Drawing Sheet

DIGITAL COHERENT RADAR

BACKGROUND OF THE INVENTION

1. Field of the Invention

Generally this invention pertains to a coherent radar system and more specifically to a means for obtaining high clutter rejection in coherent radars by generating transmitted and local oscillator signals.

2. Description of the Related Prior Art

In the past, most coherent radar transmitted signals were composed of analog generated baseband or low intermediate (IF) signals which were upconverted to the carrier frequency using a local oscillator. High precision could be obtained but there was little flexibility in the radar signals or architecture. With the advent of high-performance/high-speed digital to analog converters, signals can now be generated easily and this allows for new improved radar architectures. However, the signals after digital-to-analog conversion are not pure representations of the desired digital signal. The resulting signal is composed of the desired signal plus low level deterministic spurious signals plus noise. Current direct digital synthesis units have spurious signals on the order of −70 dBc when operating at 20 MHz rates and as low as −40 dBc when operating at 1 GHz rate. When these signals are multiplied up to carrier frequencies these spurious signal are even larger. If the spurious signals are not coherent from pulse-to-pulse, any reflection of them from clutter (i.e., echos with zero Doppler shift) will not cancel in a radar moving target indicator (MTI) system.

SUMMARY OF THE INVENTION

The object of the invention is to provide a means of obtaining high clutter rejection in radars using off-the-shelf digital-to-analog converters to generate a transmitted and a local oscillator signals.

This and other objectives of this invention are achieved by a digital coherent radar that generates its transmitted waveform from a low intermediate frequency (IF) and a local oscillator (LO) by digitally generated waveforms after passing through digital-to-analog (D/A) converters. The LO is upconverted using a product multiplier. The IF representation of the transmitted waveform is upconverted using the LO. The transmitted waveform is amplified and passed through a circulator to an antenna. The echos are received through the antenna and passed through the circulator and receiver protector. The received signal is then downconverted to a digital signal and passed on to a processor. Finally, the waveform is reset and restarted by the local oscillator generator, the digital-to-analog converters, and the analog-to-digital converter at the beginning of each pulse. It must be insured that all pulses in a pulse train are identical even though there are deterministic errors in the representation of the transmitted signals desired coherent component. This insures that all transmitted and received signals regardless of their errors in representation (i.e., spurious signal content) have the same exact representation from pulse-to-pulse for clutter like signals. If this is not done, the error type echo signals (i.e., spurious signals) will not be the same every pulse and may not cancel while the intended signal will.

DESCRIPTION OF THE PREFERRED EMBODIMENT

Figure 1:
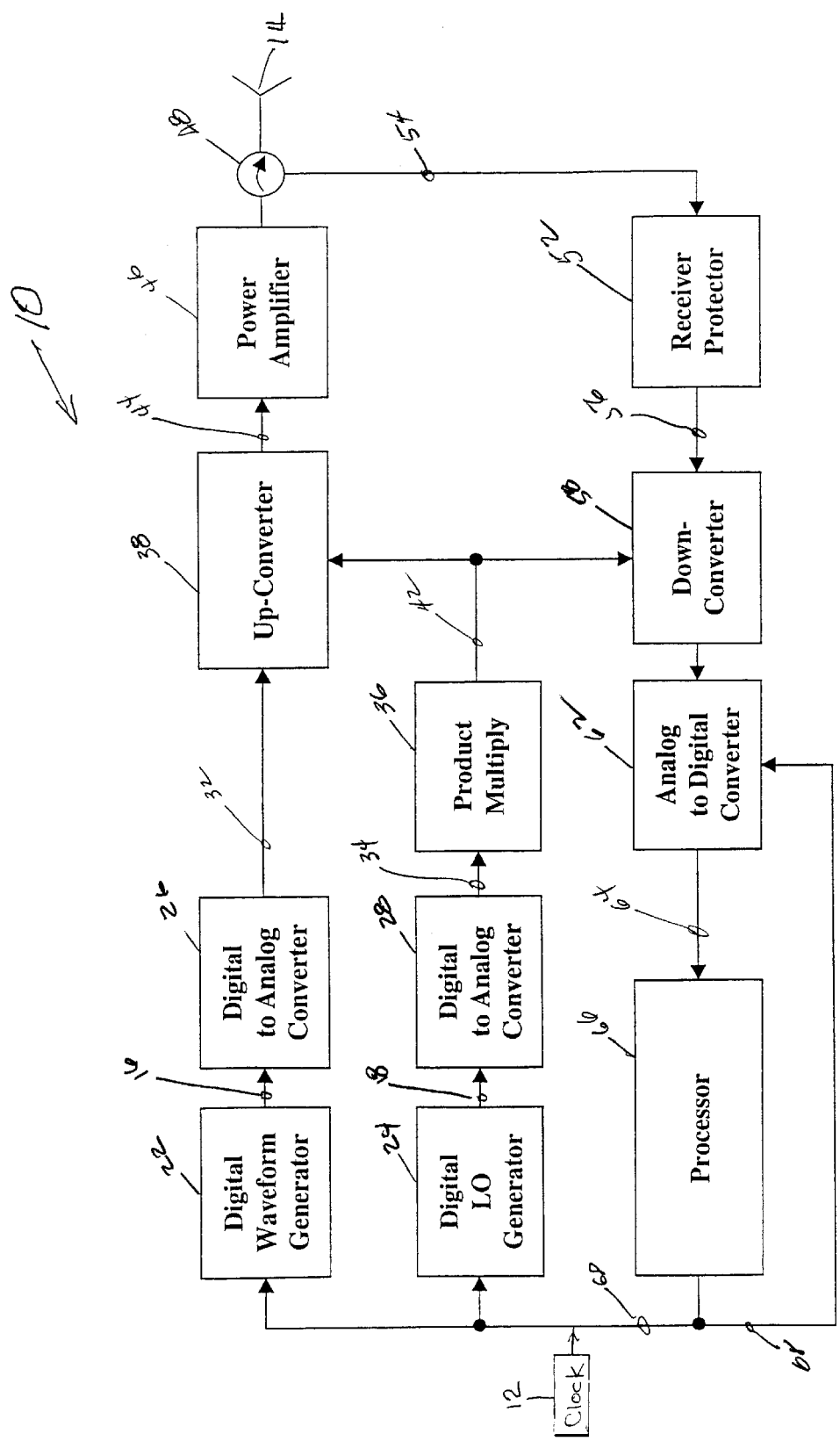
FIG. 1 shows a block diagram of a coherent radar that generates its transmitted waveform from a low intermediate frequency (IF) and a local oscillator (LO) by digitally generated waveforms after passing through digital-to-analog (D/A) converters.

In the preferred embodiment of the digital coherent radar 10, as shown in FIG. 1, every radar pulse originating within a digital local oscillator (DLO) is restarted at the same time by a timing device 12, such as a digital clock found in a microprocessor or an atomic clock, so that any spurious radiation present on a returned microwave signal from an antenna 14 is within the clutter and not present in the Doppler passband of the radar system 10. When during the processing of the return signal the clutter is canceled out, the spurious signal is also canceled out and no false returns are presented to an operator.

In the transmit mode of the digital coherent radar system 10, a transmitted waveform 16 and 18 is generated by a low intermediate frequency (IF) digital generator 22 and a digital local oscillator 24, respectfully, and passed through respective digital-to-analog converters 26 and 28, respectfully, to produce analog signals 32 and 34, respectively. The analog local oscillator signal 34 is increased in frequency using a product multiplier 36. The analog IF 32 representation of the transmitted waveform is upconverted in an upconverter 38 using the analog local oscillator upconverted signal 42. The transmitted waveform 44 is then amplified in a power amplifier 46 and passed through a circulator 48 to the antenna 14.

In the receive mode, an electrical signal or echo is received through the antenna 14, passed through the circulator 48, and receiver protector 52 which protects the receiver from being subjected to incoming signals 54 of sufficient strength to damage the receive portions of the radar system. The received signal 56 is then downconverted in a downconverter 58, converted to a digital signal 64 in an analog-to-digital converter 62 and processed in a signal processor circuit 66 where the signal 64 is Doppler filtered.

The waveform 68 is then reset and started in low intermediate frequency (IF) digital generator 22 and a digital local oscillator 24, and the associated digital-to-analog converters 26 and 28, respectively, as well as in the analog-to-digital converter 62 at the beginning of each pulse. This insures that all transmitted and received signals, regardless of their errors in representation (i.e., spurious signal content) have the same exact representation from pulse-to-pulse for clutter like signals. If this resetting process is not done, as in the prior art, the error type echo signals (i.e., spurious signals) will not be the same for every pulse and may not cancel while the intended signal will. The object of this invention is to insure all pulses in a pulse train are identical even though there are deterministic errors in the representation of the transmitted signals desired coherent component. A special note should be made, if the low intermediate frequency (IF) digital generator 22 and a digital local oscillator 24 signal's are generated from free running direct digital synthesis units, as in the prior art, the echos from spurious signals will not cancel in the radar moving target indicator (MTI), located within the signal processing electronics 66, where as they will if the digital synthesis unit is reset at the beginning of each pulse.

The advantage of this invention is that extremely accurate conversions between digital and analog signals are not required to obtain high clutter rejection as long as these conversions are highly repeatable on a pulse-to-pulse basis. The feature in this invention to insure the digital-to-analog converters 26 and 28 and the analog-to-digital converter 62 are reset and precisely repeated after every pulse.

Although the invention has been described in relation to an exemplary embodiment thereof, it will be understood by those skilled in the art that still other variations and modifications can be affected in the preferred embodiment without detracting from the scope and spirit of the invention as described in the claims.

What is claimed:

1. A method for obtaining high clutter rejection in radars comprising the steps of:

Resetting and restarting each pulse in a digitally formated pulse train of an electromagnetic signal at the beginning of each pulse by a timing signal so as to insure that all transmitted and received pulses have the same digitally representations from pulse-to-pulse for clutter like waveforms, thereby the received pulse waveform are the same for each error type received waveform.

2. A digital coherent radar system comprised of:

means for generating a digital transmitted waveform comprised of a plurality of electromagnetic pulses that is transmitted through an antenna;

means for receiving a returned waveform electromagnetic pulse and converting said pulse to a digital waveform;

means for resetting and restarting the transmitted waveform so as to insure that all transmitted and received pulses regardless of their errors in presentation have the same exact representation from pulse-to-pulse for clutter like signals; and means for adding the transmitted waveform with the received waveform to eliminate errors in representation, a pulse train of digitally formatted electromagnetic pulses transmitted by said radar system; and each pulse in the pulse train is reset and restarted at the beginning of each pulse by a timing signal so as to insure that all transmitted and received pulses have the same digitally representations from pulse-to-pulse for clutter like waveforms, thereby the received pulse waveform are the same for each error type received waveform.

3. A system, as in claim 2, wherein the means for generating a digital transmitted waveform comprised is by digitally generated waveforms from a digital waveform generator and a digital local oscillator.

4. A system, as in claim 2, wherein the means for receiving a returned waveform electromagnetic pulse and converting said pulse to a digital waveform is an analog-to-digital converter.

5. A system, as in claim 2, wherein the means for resetting and restarting the transmitted waveform so as to insure that all transmitted and received pulses regardless of their errors in presentation have the same exact representation from pulse-to-pulse for clutter like signals is a timing device.

6. A system, as in claim 2, wherein the timing device is a microprocessor.

7. A system, as in claim 2, wherein the timing device is an atomic clock.

8. A system, as in claim 2, wherein the means for adding the transmitted waveform with the received waveform to eliminate errors in representation is a microprocessor.

9. A system, as in claim 2, wherein the means for adding the transmitted waveform with the received waveform to eliminate errors in representation is a computer.

* * * * *